United States Patent Office.

HERMANN H. KESSLER, OF DETROIT, MICHIGAN.

Letters Patent No. 102,833, dated May 10, 1870.

IMPROVEMENT IN THE MANUFACTURE OF MEDICATED MALT LIQUORS.

The Schedule referred to in these Letters Patent and making part of the same

*To whom it may concern:*

Be it known that I, HERMANN H. KESSLER, of Detroit, in the county of Wayne and State of Michigan, have invented a new and useful Improvement in the Manufacture of Malt Liquors or Beer; and I do declare that the following is a true and accurate description thereof.

The nature of this invention relates to an improvement in the manufacture of beer or malt liquors, by means of which said beer is made healthful and a medicament against diseases of the stomach and the liver, and a specific remedy for bile and dyspepsia, while, at the same time, it will promote a healthy circulation of the blood.

The invention consists in adding to said beer or malt liquor a sirup made of the ingredients, substantially in the proportions, and in the manner hereinafter described.

I steep for a full half-hour, at a boiling temperature, in four quarts of soft clear water, four (4) ounces of Iceland moss, four (4) ounces of licorice root, three (3) ounces of calamus, five (5) ounces of coriander seed, and three (3) ounces of buck-thorn bark. Then I strain off the sirup, to remove all the sediment, and add five (5) pounds of sugar, (white is preferable,) and boil until all the impurities are thrown off, and the liquor is perfectly clear. Then I allow the sirup to cool, and, after cooling, mix therein one (1) pint of burned sugar.

Beer brewed in the ordinary manner is then added in the proportion of one (1) barrel to the quantity of sirup above described. Then cork tightly, and allow the whole to stand for one week, when it is ready for bottling or use.

What I claim as my invention, and desire to secure by Letters Patent, is—

The manufacture of beer or malt liquors of the ingredients, in the manner, and in the proportions, substantially as herein described.

HERMANN H. KESSLER.

Witnesses:
   THOS. S. SPRAGUE,
   S. J. SPRAY.